United States Patent
Selwood

(10) Patent No.: US 8,137,139 B2
(45) Date of Patent: Mar. 20, 2012

(54) CIRCUIT BOARD CONNECTOR WITH DRILLING TAMPER DETECTION ARRANGEMENT

(75) Inventor: Andrew George Selwood, Berkshire (GB)

(73) Assignee: Keymat Technology Limited, Middlesex (GB)

( * ) Notice: Subject to any disclaimer, the term of this patent is extended or adjusted under 35 U.S.C. 154(b) by 0 days.

(21) Appl. No.: 13/178,179

(22) Filed: Jul. 7, 2011

(65) Prior Publication Data
US 2012/0009826 A1 Jan. 12, 2012

(30) Foreign Application Priority Data
Jul. 8, 2010 (GB) .................................. 1011496.5

(51) Int. Cl.
*H01R 12/00* (2006.01)
(52) U.S. Cl. ....................................................... 439/660
(58) Field of Classification Search .................... 439/67, 439/64, 66, 74, 75, 77, 628, 638, 660
See application file for complete search history.

(56) References Cited

U.S. PATENT DOCUMENTS

| | | | | |
|---|---|---|---|---|
| 5,249,098 | A * | 9/1993 | Rostoker et al. | 361/600 |
| 6,053,747 | A | 4/2000 | Aggus et al. | |
| 6,184,133 | B1 * | 2/2001 | Iijima et al. | 438/667 |
| 6,302,705 | B1 | 10/2001 | Yatskov et al. | |
| 6,438,825 | B1 | 8/2002 | Kuhn | |
| 6,562,709 | B1 * | 5/2003 | Lin | 438/618 |
| 6,895,509 | B1 | 5/2005 | Clark | |
| 7,640,658 | B1 | 1/2010 | Pham et al. | |
| 2005/0070136 | A1 | 3/2005 | Korsunsky et al. | |
| 2007/0105407 | A1 | 5/2007 | Dwan et al. | |
| 2007/0184681 | A1 | 8/2007 | Tutt et al. | |
| 2008/0132118 | A1 | 6/2008 | Dalzell et al. | |
| 2009/0124100 | A1 * | 5/2009 | Mason et al. | 439/66 |
| 2009/0197437 | A1 * | 8/2009 | Ouchi et al. | 439/68 |
| 2009/0309242 | A1 * | 12/2009 | Mizuno et al. | 257/786 |
| 2010/0208436 | A1 | 8/2010 | Cremer et al. | |

FOREIGN PATENT DOCUMENTS

| | | |
|---|---|---|
| EP | 0526066 A1 | 2/1993 |
| EP | 1273997 A2 | 1/2003 |
| EP | 1432031 A1 | 6/2004 |
| GB | 2276502 A | 9/1994 |
| WO | WO 01/63994 | 8/2001 |
| WO | WO 03/019467 | 3/2003 |
| WO | WO 2009/037250 | 3/2009 |

OTHER PUBLICATIONS

GB Search Report dated Oct. 15, 2010.
European Search Report and Search Opinion for EP Application No. 11 172 499.3 dated Sep. 26, 2011 (6 pp.).

* cited by examiner

*Primary Examiner* — Tulsidas C Patel
*Assistant Examiner* — Phuongchi Nguyen
(74) *Attorney, Agent, or Firm* — Workman Nydegger

(57) ABSTRACT

A connector (26) transmits electrical signals between two electronic circuit boards (10, 12). The connector (26) comprises an electrically non-conductive support having two spaced surfaces (36, 38). Each surface (36, 38) has a respective interface (42) for electrical connection with a respective one of the two electronic circuit boards (10, 12) to be connected. At least one electrical conductor passes through the support and connects the two interfaces (42) for transmitting electrical signals between the two interfaces. The support also has an external surface (40). At least one electrically conductive pathway (A, B, C) is provided between the external surface (40) and the at least one electrical conductor for detecting an attempt to drill from the external surface to the at least one electrical conductor.

15 Claims, 4 Drawing Sheets

US 8,137,139 B2

CIRCUIT BOARD CONNECTOR WITH DRILLING TAMPER DETECTION ARRANGEMENT

CROSS REFERENCE TO RELATED APPLICATIONS

The present application claims priority to United Kingdom Application 1011496.5 entitled CIRCUIT BOARD CONNECTOR WITH DRILLING TAMPER DETECTION ARRANGEMENT filed Jul. 8, 2010, which is incorporated herein by reference.

SUMMARY OF SOME EXAMPLE EMBODIMENTS

The invention relates to a connector for transmitting electrical signals between two electronic circuit boards.

A connector is used to transmit electrical signals between two electronic circuit boards. The signals transmitted by the connector may convey sensitive information, such as proprietary information or other information that must be kept secure. For example, a connector may be used in a cash dispenser to transmit signals corresponding to the PIN number of a cash card. Hence, in many situations, it is desirable to prevent unauthorised monitoring of the signals that are being transmitted by the connector.

In accordance with the invention, there is provided a connector for transmitting electrical signals between two electronic circuit boards, comprising: an electrically non-conductive support having two spaced surfaces, each surface having a respective interface for electrical connection with a respective one of the two electronic circuit boards to be connected; at least one electrical signal conductor for passing through the support and connecting the two interfaces for transmitting electrical signals therebetween; and external surface; a plurality of holes extending through the support so as to form at least one row of holes positioned between the external surface and the at least one electrical signal conductor connecting the interfaces, each hole being provided with a respective electrical conductor extending therethrough and the hole conductors being connected to one another to form at least one electrically conductive pathway positioned between the external surface and the at least one electrical signal conductor for detecting an attempt to drill from the external surface to the at least one electrical signal conductor.

In many cases, an unauthorised attempt to monitor the signals being transmitted by the connector will involve drilling into the connector, from the external surface, to monitor the electrical signals passing through the at least one electrical signal conductor connecting the interfaces. Such an attempt will tend to disrupt the at least one electrically conductive pathway, which can be detected.

BRIEF DESCRIPTION OF THE DRAWINGS

The following is a more detailed description of embodiments of the invention, by way of example, reference being made to the appended schematic drawings in which.

DETAILED DESCRIPTION

Figure 1:
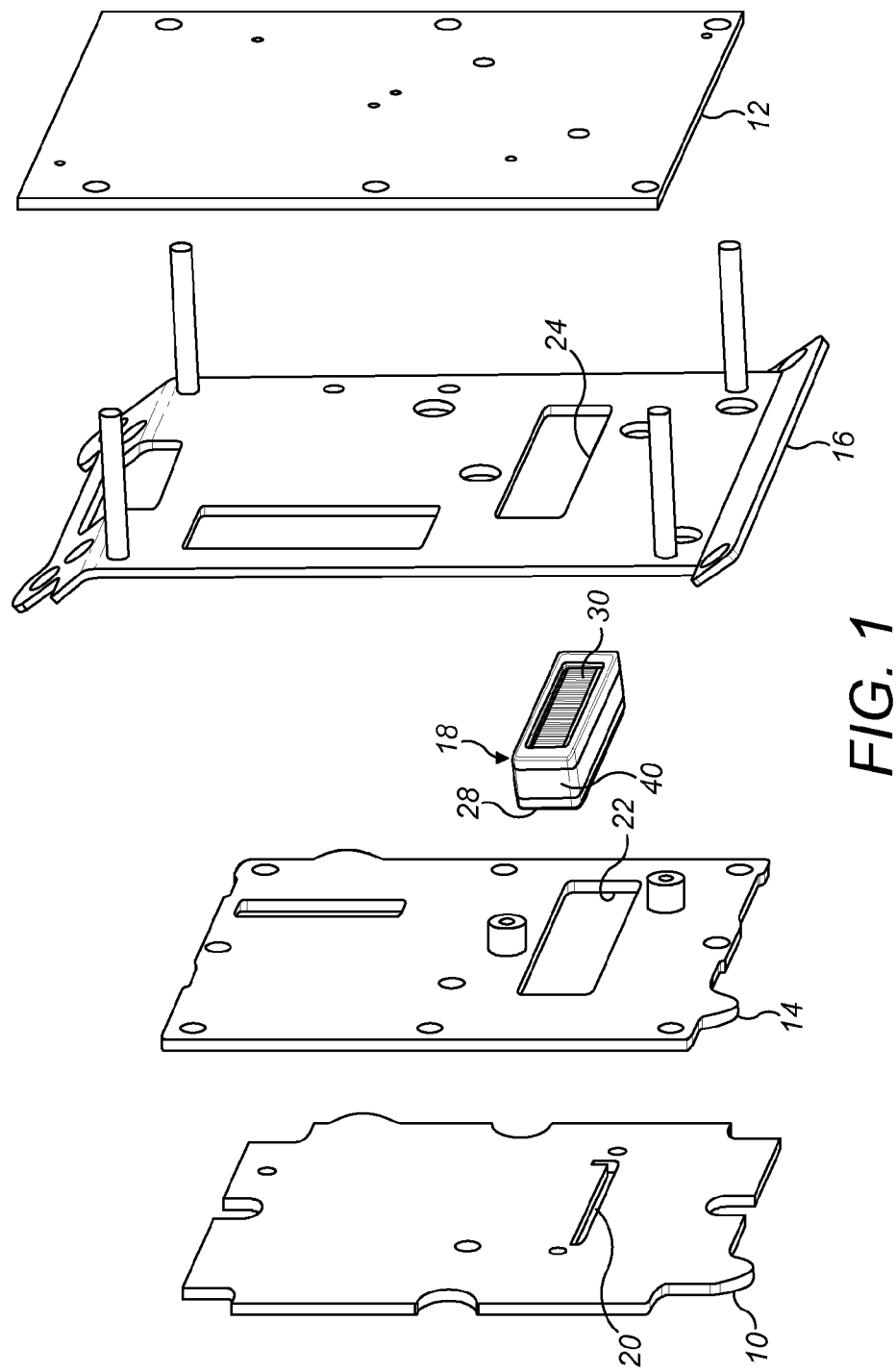
FIG. 1 is an exploded view of a printed circuit board assembly.

Referring first to FIG. 1, the printed circuit board assembly comprises first and second printed circuit boards 10, 12, first and second mounting plates 14, 16 and an interconnecting assembly 18.

The first printed circuit board 10 has an array 20 of twenty contact pads. The second printed circuit board 12 also has an array of twenty contact pads (not shown in the figures). The contact pads of the two arrays 20 are of the same size, and the arrays have the same configuration and pitch between the contact pads as one another.

The two arrays 20 of contact pads are used to transmit information between the two printed circuit boards 10, 12 and the information is transmitted in the form of electrical signals that pass through the interconnecting assembly 18. This will be described in more detail below.

Still referring to FIG. 1, the first mounting plate 14 is provided with an aperture 22. Similarly, the second mounting plate 16 is provided with an aperture 24. In use, the first and second mounting plates 14, 16 are mounted together such that the mounting plates 14, 16 are generally parallel to one another. The first printed circuit board 10 is mounted on the external side of the first mounting plate 14 such that the array 20 of contact pads coincides with the aperture 22. Similarly, the second printed circuit board 12 is mounted on the external side of the second mounting plate 16 such that the array of contact pads on the second printed circuit board 12 coincides with the aperture 24 in the second mounting plate 16. The two arrays 20 of contact pads face one another with each contact pad facing a corresponding contact pad in the opposite array. The apertures 22, 24 serve to receive the interconnecting assembly 18, as will be discussed in more detail below.

Figure 2:
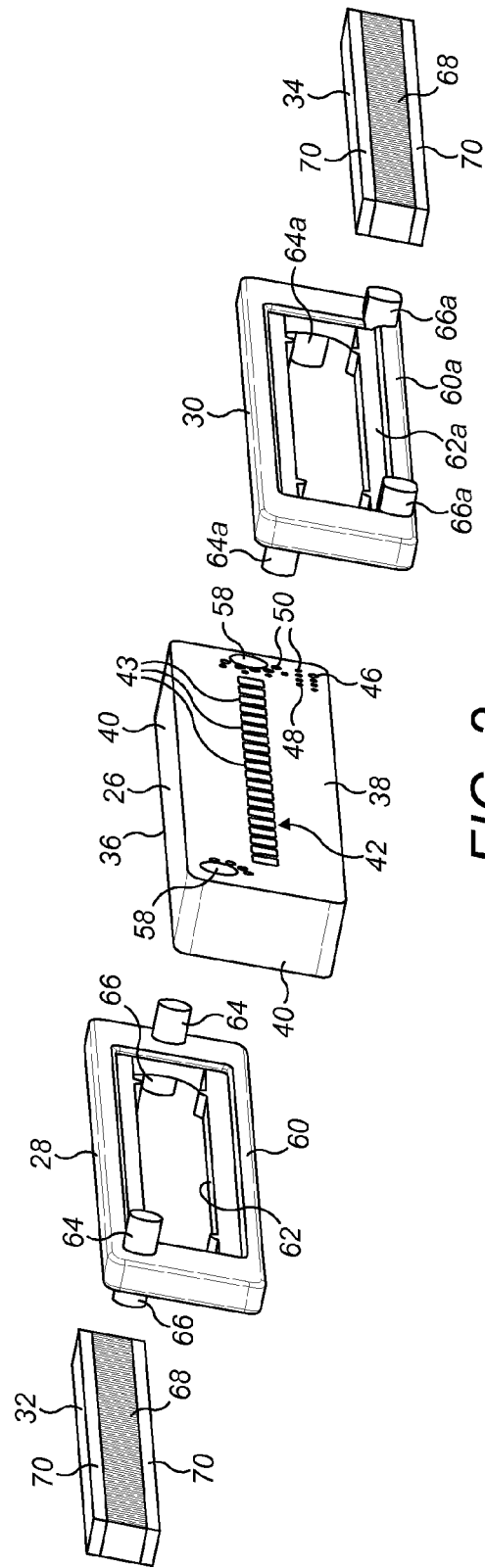
FIG. 2 is an exploded view of an interconnecting assembly which forms part of the printed circuit board assembly of FIG. 1.

As shown in FIG. 2, the interconnecting assembly 18 comprises a connector 26, first and second locators 28, 30, and first and second elastomeric connectors 32, 34.

Figure 3:
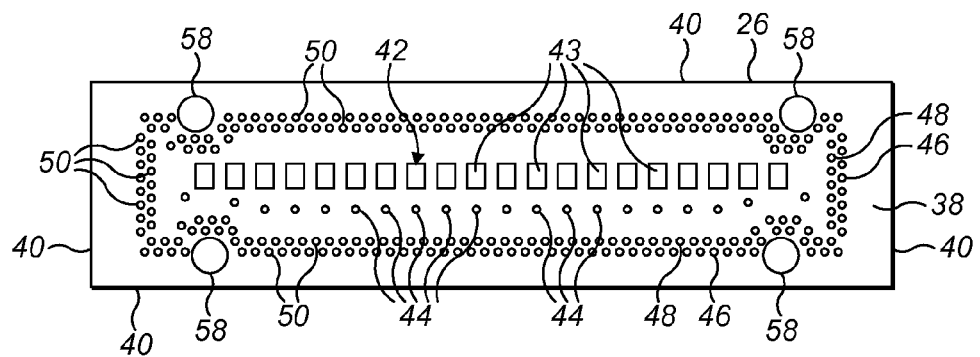
FIG. 3 is a plan view showing a connector of the interconnecting assembly of FIG. 2.

Referring to FIGS. 2 and 3, the connector 26 is a printed circuit board of two or more layers. The connector 26 has first and second opposite, rectangular, planar surfaces 36, 38 that are connected by an annular peripheral surface 40. A first array of twenty contact pads (not shown in the drawings) is provided on the first planar surface 36 of the connector 26. A second array 42 of twenty contact pads 43 is provided on the second planar surface 38 of the connector 26. The two arrays 42 that are provided on the connector 26 have the same configuration and pitch between the contact pads 43 as one another, and also as the two arrays 20 provided on the printed circuit boards 10, 12.

Each contact pad 43 in each array 42 on the connector 26 is electrically connected to a corresponding contact pad 43 in the other array 42 of the connector 26. This is achieved using twenty through-plated holes 44 which extend between the first planar surface 36 and the second planar surface 38. As best seen in FIG. 3, each contact pad 43 is associated with a corresponding through-plated hole 44 located adjacent to the contact pad. The through-plated hole 44 extends through the substrate of the connector 26 to the opposite surface adjacent to the corresponding contact pad. Each through-plated hole 44 has a thin metallic coating which acts as an electrical conductor extending between the two planar surfaces 36, 38 of the connector 26. At each planar surface 36, 38, the conductive coating is connected to the corresponding contact pad by a conductive track (not shown) on the planar surface 36, 38. For the sake of clarity, the through-plated holes 44 are not shown in FIG. 2 (but are visible in FIG. 3).

As seen in FIG. 3, the connector 26 also has two rows 46, 48 of peripherally located through plated holes 50. The two rows 46, 48 extend around the connector 26, adjacent to the annular peripheral surface 40. Each one of the peripheral holes 50 extends between the first planar surface 36 and the second planar surface 38. As seen in FIG. 3, the peripheral holes 50 of the two rows 46, 48 are staggered relative to one another. In this way, each hole 50 is approximately equidistant from two adjacent holes 50 in the other row 46, 48. Each peripheral hole 50 of the two rows 46, 48 is provided with a respective metallic plating that extends between the first planar surface 36 and the second planar surface 38. Each such plating serves as an electrical conductor extending between the two planar surfaces 36, 38.

Figure 4:
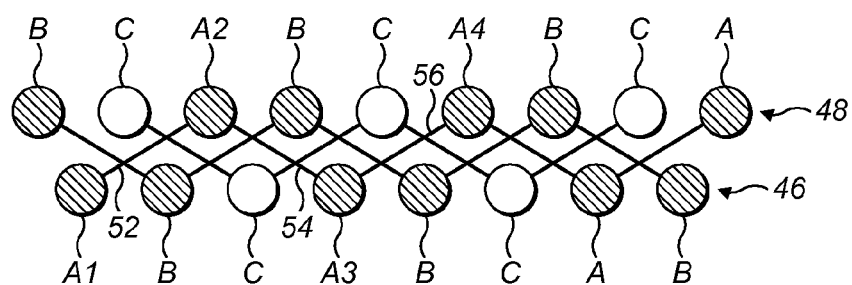
FIG. 4 shows detail of parts of three electrically conductive pathways of the connector of FIG. 3.

As represented in FIG. 4, the platings provided within the peripheral holes 50 of the two rows 46, 48 are connected together so as to form three separate conductive pathways (A, B, C). In FIG. 4, the circles represent the conductive platings passing through the peripheral holes 50. In order to demonstrate the three conductive pathways, each plating has been labelled with the letter A, B or C. The platings given the letter A are connected together to form a first conductive pathway. The platings given the letter B are connected together to form a second conductive pathway. Finally, the platings given the letter C are connected together to form a third conductive pathway. Hence, considering the first conductive pathway, and starting at the left hand side of FIG. 4, a first plating A1, located in the outer row 46, is connected to a second plating A2 located in the inner row 48 by a first track 52 provided on the first planar surface 36. The second plating A2 is connected to a third plating A3, located in the outer row 46, by a second track 54 located on the second planar surface 38. The third plating A3 is connected to a fourth plating A4, located in the inner row 48, by a third track 56 located on the first planar surface 36. This connection is continued so that the platings A of the first conductive pathway are connected in series with one another, alternating between a plating in the outer row 46 and a plating in the inner row 48. The first conductive pathway extends substantially all around the connector 26.

The platings B, C of the second and third conductive pathways are connected together in a similar manner, such that each of the second and third conductive pathways also extend substantially all around the connector 26.

For clarity, only a few of the peripheral through plated holes 50 are shown in FIG. 2. The tracks 52, 54, 56 connecting the platings A, B, C are not shown, for clarity, in either FIG. 2 or FIG. 3.

The connector 26 is also provided with a plurality of locator holes 58.

The first and second locators 28, 30 are best seen in FIG. 2. The first and second locators 28, 30 are similar to one another and only the first locator 28 will be described in detail. The first locator 28 is formed by moulding from a suitable material, such as a polymer. The first locator 28 has a rectangular frame 60 which defines a rectangular opening 62. One side of the rectangular frame 60 is provided with two locator pegs 64. The other side of the rectangular frame 60 is also provided with two locator pegs 66. The rectangular frame 60 of the first locator 28 has the same thickness as the mounting plates 14, 16. The components of the second locator 30, not described in detail, are identified by reference numerals corresponding to those accorded to the first located 28 and given the suffix a.

The two elastomeric connectors 32, 34 are identical to one another, and are well known, commercially available products. Each elastomeric connector 32, 34 has a central portion 68 formed from alternating layers of electrically conductive and electrically non-conductive elastomeric material. In addition, each elastomeric connector 32, 34 has two side portions 70 which are electrically non-conductive.

The interconnecting assembly 18 is assembled as follows.

The first locator 28 is mounted against the first planar surface 36 of the connector 26 by inserting the locator pegs 64 into the locator holes 58 provided in the connector 26. The second locator 30 is then mounted against the second planar surface 38 of the connector 26 by inserting the locator pegs 64a into the locator holes 58 of the connector 26. The first elastomeric connector 32 is then inserted into the rectangular opening 62 in the first locator 28. In this way, the alternating conductive and non-conductive layers of the central portion 68 contact the array of contact pads on the first planar surface 36. Finally, the second elastomeric connector 34 is inserted into the rectangular opening 62a of the second locator 30. Again, the alternating conductive and non-conductive layers of the central portion 68 contact the array 42 of contact pads 43 provided on the second planar surface 38 of the connector 26.

Returning now to FIG. 1, when the printed circuit board assembly is assembled, the first locator 28 lies closely within the aperture 22 in the first mounting plate 14. The second locator 30 lies closely within the aperture 24 in the second mounting plate 16. The central portion 68 of the first elastomeric connector 32 contacts the array 20 of contact pads on the first printed circuit board 10. In this way, the first elastomeric connector 32 connects each contact pad of the array 20 on the first printed circuit board 10 with a corresponding contact pad of the array provided on the first planar surface 36 of the connector 26. In a similar manner, the second elastomeric connector 34 lies between the connector 26 and the second printed circuit board 12. The second elastomeric connector 34 connects each contact pad on the second printed circuit board 12 with a corresponding contact pad 43 of the array 42 provided on the second planar surface 38 of the connector 26. Hence, the interconnecting assembly 18 provides an electrical connection between the first and second printed circuit boards 10, 12 allowing electrical signals to be passed therebetween.

By way of more detailed explanation, the first contact pad in the array 20 on the first printed circuit board 10 is connected via the first elastomeric connector 32 to the first contact pad on the first planar surface 36 of the connector 26. In turn, this contact pad is connected, via the corresponding one of the through-plated holes 44, to the first contact pad 43 in the array 42 on the second planar surface 38 of the connector 26. This contact pad is, in turn, connected via the second elastomeric connector 34 to the first contact pad in the array on the second printed circuit board 12.

The connector 26 lies between the first and second mounting plates 14, 16 which are spaced from one another. It is possible that a person wishing to monitor signals passing through the connector 26 might attempt to drill into the connector 26, at the annular peripheral surface 40, with the aim of trying to establish electrical connection with one or more of the through-plated holes 44 which carry the signals between the first and second arrays 42 of the connector 26. However, the two rows 46, 48 of peripheral through plated holes 50, and the three electrically conductive pathways A, B, C of which the platings form part of, allow such attempts to drill into the connector 26 to be detected.

The peripheral through plated holes 50 are positioned sufficiently closely to one another so that any attempt to drill through the rows 46, 48 will result in some of the holes 50 being disrupted by the drill bit. The platings are relatively thin and the platings will tend to be broken in those holes 50 that are disrupted by a drill bit. This will serve to break one or more of the conductive pathways A, B, C or, alternatively, to connect a pair of the conductive pathways A, B, C.

Hence, the three conductive pathways A, B, C formed by the platings in the peripheral holes 50 (together with the conductive tracks such as 52, 54 and 56 on the planar surfaces 36, 38) can be monitored by any suitable "tamper" circuit to detect drilling into the connector 26. If any disruption of the conductive pathways A, B, C is detected by the tamper circuit, then the first and second printed circuit boards 10, 12 may be shut down. In addition, any sensitive information that is stored may be deleted to prevent unauthorised access.

Figure 5:
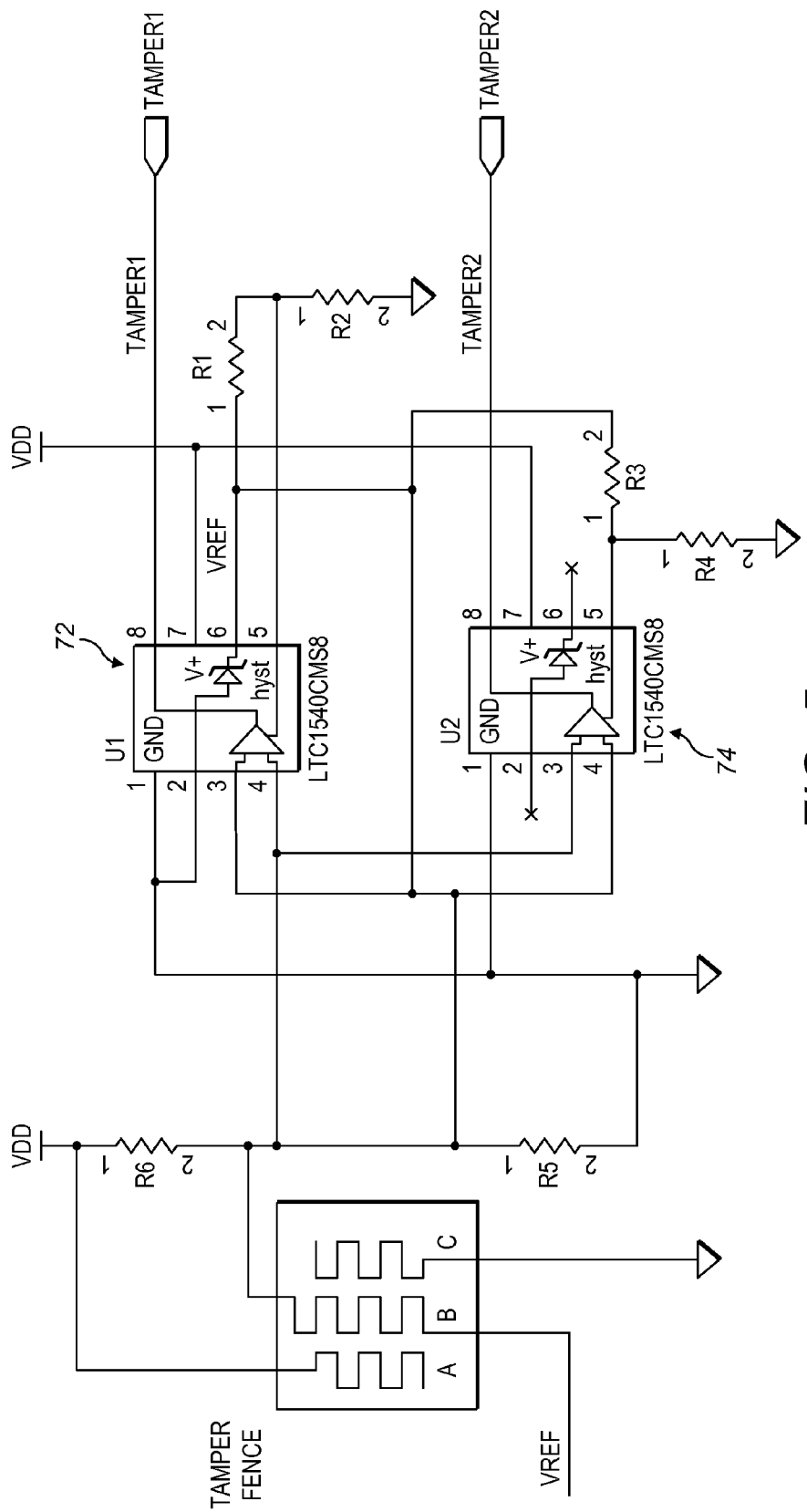
FIG. 5 shows an electrical circuit electrically connected to the connector of FIG. 3.

An example of a suitable tamper circuit is shown in FIG. 5, which also shows, in schematic form, the three conductive pathways (A, B, C) passing through the platings of the peripheral holes 50. The tamper circuit has two comparators U1 and U2 identified at 72 and 74, respectively. U1 and U2 are set with hysteresis set by R1/R2 and R3/R4, respectively. VREF is provided to both comparator inputs, one input directly and one input via the second conductive pathway B. The input senses are inverted for U1 compared to U2. Tamper 1 and Tamper 2 thus sit at levels determined by the slight input differential between the positive and negatives inputs of the comparators and are kept stable by the hysteresis.

An attempt at drilling through the two rows 46, 48 will, almost inevitably, result in one or more of the following three outcomes. Firstly, the second conductive pathway B may be broken. Secondly, the first conductive pathway A may be electrically connected to the second conductive pathway B. Thirdly, the second conductive pathway B may be electrically connected to the third conductive pathway C. Any of these outcomes is detected by one or both comparators U1, U2, as the balance of the voltages on the positive and negative inputs will change. This will provide an indication by a change of state on Tamper 1 or Tamper 2 or on both of Tamper 1 and Tamper 2.

In this way, any disruption of the peripheral holes 50 and the conductive platings provided in the holes 50 will be detected.

The mounting plates 14, 16 are made of a hard material, such as a suitable metal. The locators 28, 30 fit closely within the apertures 22, 24 of the mounting plates 14, 16 and so are protected by the mounting plates against drilling. Similarly, the electrometric connectors 32, 34 are protected by the mounting plates 14, 16.

It will be appreciated that the embodiment described above is provided by way of example and that many modifications may be made without departing from the scope of the invention as defined by the claims.

It is not necessary to use three electrically conductive pathways A, B, C. A single pathway can be used. Alternatively, a plural number other than 3 may be used.

In the embodiment described above, the three electrically conductive pathways A, B, C extend all around the periphery of the connector 26. This ensures that an attempt to drill into the connector 26 will be detected regardless of the position on the peripheral surface 40 at which drilling is commenced. However, in some embodiments it may only be necessary to protect from drilling at a certain region of the connector 26 in which case the conductive pathways do not need to extend all around the connector 26.

Any suitable tamper circuit can be used to detect disruption of the electrically conductive pathway or pathways.

The arrays 42 of contact pads 43 on the connector 26 need not be as described. Different numbers and configurations of contact pads 43 may be used. Indeed any interfaces suitable for communicating with electronic circuit boards may be used instead of the arrays 42 described. Where contact pads are used, any suitable electrical conductor(s) may be used to convey signals from the contact pads on one planar surface 36 to the contact pads on the other planar surface 38, with the proviso that the electrical conductor(s) will pass through the connector 26.

The connector 26 need not have the shape shown in the drawings. Generally, however, the connector will have two spaced surfaces with each surface being provided with a respective interface for connection to a respective electronic circuit board. The two spaced surfaces and the associated interfaces may be part of a greater number of surfaces/interfaces. That is to say, the connector may have in total three or more interfaces for connecting a corresponding number of electronic circuit boards.

The elastomeric connectors 32, 34 are used to connect the connector 26 to the printed circuit boards 10, 12 but any suitable form of connection may be used. The locators 28, 30 and the mounting plates 14, 16 may be replaced by any suitable mounting means.

In the example described above, the mounting plates 14, 16 are formed of a hard material and this serves to protect against attempts to drill into, and monitor electrical signals within, the elastomeric connectors 32, 34. However, an alternative approach would be to make the locators 28, 30 out of a hard material, in which case the locators 28, 30 would protect the elastomeric connectors 32, 34.

What is claimed is:

1. A connector for transmitting electrical signals between two electronic circuit boards, comprising: an electrically non-conductive support having two spaced surfaces, each surface having a respective interface for electrical connection with a respective one of the two electronic circuit boards to be connected; at least one electrical signal conductor passing through the support and connecting the two interfaces for transmitting electrical signals therebetween; an external surface; a plurality of holes extending through the support so as to form at least one row of holes positioned between the external surface and the at least one electrical signal conductor connecting the interfaces, each hole being provided with a respective electrical conductor extending therethrough and the hole conductors being connected to one another to form at least one electrically conductive pathway positioned between the external surface and the at least one electrical signal conductor, and wherein the at least one electrically conductive pathway is electrically connectible to a circuit that is configured to detect disruption of the at least one electrically conductive pathway caused by drilling from the external surface into the at least one electrical signal conductor.

2. A connector according to claim 1, wherein each hole conductor is a respective coating on a respective surface of the non-conductive support, each said coated surface bordering a corresponding one of the holes.

3. A connector according to claim 1, wherein each hole extends between the two spaced surfaces of the support.

4. A connector according to claim 1, wherein the connector is a double sided or multi-layer circuit board and the holes are plated through-holes in the circuit board.

5. A connector according to claim 1, wherein the at least one conductive pathway comprises a plurality of conductive portions extending through the support and being generally parallel to one another.

6. A connector according to claim 1, wherein there are two parallel rows of holes, the two rows being staggered so that each hole is located generally equidistant to two adjacent holes of the other row.

7. A connector according to claim 6, wherein the hole conductors are connected to form at least two separate conductive pathways.

8. A connector according to claim 1, wherein each interface comprises a respective plurality of contact pads, each contact pad being electrically connected to a corresponding contact pad in the other interface.

9. A connector according to claim 8, wherein the connection between each contact pad and the corresponding contact pad in the other interface is via a respective plated through hole passing through the support.

10. A tamper detection system comprising:
a connector for transmitting electrical signals between two electronic circuit boards, the connector comprising: an electrically non-conductive support having two spaced surfaces, each surface having a respective interface for electrical connection with a respective one of the two electronic circuit boards to be connected; at least one electrical signal conductor passing through the support and connecting the two interfaces for transmitting electrical signals therebetween; an external surface; a plurality of holes extending through the support so as to form at least one row of holes positioned between the external surface and the at least one electrical signal conductor connecting the interfaces, each hole being provided with a respective electrical conductor extending therethrough and the hole conductors being connected to one another to form at least one electrically conductive pathway positioned between the external surface and the at least one electrical signal conductor; and a circuit electrically connected to the at least one electrically conductive pathway and the circuit configured to detect disruption of the at least one electrically conductive pathway caused by drilling from the external surface into the at least one electrical signal conductor.

11. A tamper detection system according to claim 10, wherein the circuit is operative to detect a break in the at least one conductive pathway.

12. A tamper detection system according to claim 10, wherein the at least one conductive pathway comprises two separate conductive pathways and the circuit is operable to detect electrical connection of said two conductive pathways.

13. An assembly comprising two electronic circuit boards and the tamper detection system according to claim 10, the connector transmitting electrical signals at least from one circuit board to the other.

14. An assembly according to claim 13, wherein the assembly includes an elastomeric connector connecting one of the circuit boards to the corresponding interface of the connector.

15. An assembly according to claim 14, wherein the assembly includes a mounting plate, one of the circuit boards being mounted on one side of the mounting plate, the mounting plate being provided with an aperture, the elastomeric connector being positioned in the aperture, the connector being positioned on the other side of the mounting plate.

* * * * *

UNITED STATES PATENT AND TRADEMARK OFFICE
CERTIFICATE OF CORRECTION

PATENT NO.        : 8,137,139 B2
APPLICATION NO.   : 13/178179
DATED             : March 20, 2012
INVENTOR(S)       : Selwood It is certified that error appears in the above-identified patent and that said Letters Patent is hereby corrected as shown below:

Column 1
Line 37, change "and" to --an--

Column 4
Line 66, change "closely" to --close--

Column 5
Line 46, change "electrometric" to --elastomeric--
Line 53, change "C, A" to --C. A--

Signed and Sealed this
Tenth Day of July, 2012

David J. Kappos
*Director of the United States Patent and Trademark Office*